US012412979B2

(12) United States Patent
Nasu

(10) Patent No.: US 12,412,979 B2
(45) **Date of Patent: *Sep. 9, 2025**

(54) ANTENNA DEVICE AND COMMUNICATION TERMINAL APPARATUS

(71) Applicant: Murata Manufacturing Co., Ltd., Nagaokakyo (JP)

(72) Inventor: Takafumi Nasu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 18 days.

This patent is subject to a terminal disclaimer.

(21) Appl. No.: 18/509,480

(22) Filed: Nov. 15, 2023

(65) Prior Publication Data

US 2024/0088563 A1 Mar. 14, 2024

Related U.S. Application Data

(63) Continuation of application No. 16/992,195, filed on Aug. 13, 2020, now Pat. No. 11,862,867, which is a (Continued)

(30) Foreign Application Priority Data

Apr. 25, 2018 (JP) ................................ 2018-084212

(51) Int. Cl.
*H01Q 5/378* (2015.01)
*H01F 27/28* (2006.01)
(Continued)

(52) U.S. Cl.
CPC ......... *H01Q 5/378* (2015.01); *H01F 27/2804* (2013.01); *H01F 38/14* (2013.01); *H01Q 1/243* (2013.01); *H01F 2027/2809* (2013.01)

(58) Field of Classification Search
CPC ........ H01Q 5/378; H01Q 1/243; H01Q 5/335; H01F 27/2804; H01F 38/14; H01F 2027/2809; H01F 19/04
See application file for complete search history.

(56) References Cited

U.S. PATENT DOCUMENTS 4,486,722 A * 12/1984 Landt ...................... H03J 5/246 327/503
5,914,695 A * 6/1999 Liu .......................... H01Q 9/28 343/795

(Continued)

FOREIGN PATENT DOCUMENTS

CN 110895326 B * 3/2024 ............... G01S 3/46
WO WO-2018101284 A1 * 6/2018 ............... H01Q 1/24

OTHER PUBLICATIONS

Nasu, "Antenna Device and Communication Terminal Apparatus", U.S. Appl. No. 16/992,195, filed Aug. 13, 2020.

*Primary Examiner* — Dimary S Lopez Cruz
*Assistant Examiner* — Bamidele A Immanuel
(74) *Attorney, Agent, or Firm* — Keating & Bennett, LLP

(57) ABSTRACT

An antenna device includes first and second radiating elements, a first coil coupled to the first radiating element or a feeding circuit, a second coil coupled to the second radiating element and coupled to the first coil via an electromagnetic field, and an inductor. The first and second radiating elements are coupled to each other via an electric field. The harmonic resonant frequency of a resonance circuit defined by a transformer defined by the first coil and the second coil, the inductor, and the second radiating element exists within a communication frequency range. The harmonic resonant frequency is a (2n+1)th harmonic frequency, where n is an integer equal to or greater than 1.

14 Claims, 7 Drawing Sheets

Related U.S. Application Data continuation of application No. PCT/JP2019/015892, filed on Apr. 12, 2019.

(51) Int. Cl.
*H01F 38/14* (2006.01)
*H01Q 1/24* (2006.01)

(56) References Cited

U.S. PATENT DOCUMENTS

| | | | | | |
|---|---|---|---|---|---|
| 6,111,544 | A * | 8/2000 | Dakeya | H01Q 1/243 | 343/702 |
| 8,723,753 | B2 * | 5/2014 | Kato | H01Q 1/243 | 343/860 |
| 8,912,972 | B2 * | 12/2014 | Ueki | H01Q 21/0006 | 343/742 |
| 10,348,265 | B2 * | 7/2019 | Ishizuka | H03H 7/19 | |
| 10,389,316 | B1 * | 8/2019 | Silva-Martinez | H04B 1/0458 | |
| 10,483,946 | B1 * | 11/2019 | Hrivnak | H03H 11/30 | |
| 10,680,574 | B1 * | 6/2020 | Hrivnak | H04B 1/0458 | |
| 10,680,582 | B1 * | 6/2020 | Hrivnak | H03H 7/42 | |
| 10,804,873 | B1 * | 10/2020 | Hrivnak | H03H 11/30 | |
| 10,819,017 | B2 * | 10/2020 | Gu | H01Q 9/26 | |
| 10,903,571 | B2 * | 1/2021 | Mikawa | H01Q 7/00 | |
| 2002/0196192 | A1 * | 12/2002 | Nagumo | H01Q 5/392 | 343/702 |
| 2004/0070548 | A1 * | 4/2004 | Cake | H01Q 5/371 | 343/803 |
| 2005/0231428 | A1 * | 10/2005 | Iguchi | H01Q 1/243 | 343/702 |
| 2009/0146905 | A1 * | 6/2009 | Morita | H01Q 1/38 | 343/895 |
| 2010/0201578 | A1 * | 8/2010 | Parsche | H01Q 1/38 | 343/866 |
| 2010/0213770 | A1 * | 8/2010 | Kikuchi | H01Q 1/248 | 307/104 |
| 2011/0074648 | A1 * | 3/2011 | Shinkawa | H01Q 21/30 | 343/866 |
| 2011/0084888 | A1 * | 4/2011 | Nishioka | H01Q 5/40 | 343/728 |
| 2011/0109512 | A1 * | 5/2011 | Onaka | H01Q 5/392 | 343/700 MS |
| 2011/0134014 | A1 * | 6/2011 | Kondo | H01Q 9/42 | 343/876 |
| 2011/0279349 | A1 * | 11/2011 | Tanaka | H01Q 9/40 | 343/906 |
| 2012/0086611 | A1 * | 4/2012 | Egawa | H01Q 1/521 | 343/703 |
| 2013/0207862 | A1 * | 8/2013 | Farooq | H01Q 1/243 | 343/767 |
| 2014/0014733 | A1 * | 1/2014 | Kato | H04B 5/24 | 235/492 |
| 2014/0049440 | A1 * | 2/2014 | Ueki | H01Q 5/357 | 343/852 |
| 2014/0118214 | A1 * | 5/2014 | Tanaka | H01Q 1/521 | 343/852 |
| 2014/0218246 | A1 * | 8/2014 | Ishizuka | H01Q 5/335 | 343/749 |
| 2014/0266964 | A1 * | 9/2014 | Kato | H01Q 5/335 | 343/860 |
| 2015/0009093 | A1 * | 1/2015 | Taura | H01Q 5/321 | 343/893 |
| 2015/0054349 | A1 * | 2/2015 | Ishikuro | H02J 50/80 | 307/104 |
| 2017/0117868 | A1 * | 4/2017 | Ishizuka | H01F 27/40 | |
| 2017/0133999 | A1 * | 5/2017 | Ishizuka | H01Q 1/48 | |
| 2017/0346178 | A1 * | 11/2017 | Shi | H01Q 1/50 | |
| 2018/0138747 | A1 * | 5/2018 | Mao | H02J 50/12 | |
| 2020/0153099 | A1 * | 5/2020 | Ishizuka | H01Q 21/30 | |
| 2021/0320418 | A1 * | 10/2021 | Tachibana | H01Q 5/40 | |

* cited by examiner

ANTENNA DEVICE AND COMMUNICATION TERMINAL APPARATUS

CROSS REFERENCE TO RELATED APPLICATIONS

This application claims the benefit of priority to Japanese Patent Application No. 2018-084212 filed on Apr. 25, 2018 and is a Continuation Application of PCT Application No. PCT/JP2019/015892 filed on Apr. 12, 2019. The entire contents of each application are hereby incorporated herein by reference.

BACKGROUND OF THE INVENTION

1. Field of the Invention

The present invention relates to an antenna device including an antenna coupling element coupled between a plurality of radiating elements and a feeding circuit and also relates to a communication terminal apparatus.

2. Description of the Related Art

In order to widen the usable frequency range of an antenna device or to support a plurality of frequency ranges, an antenna device including two radiating elements directly or indirectly coupled to each other is used. Japanese Patent No. 5505561 discloses an antenna device including two radiating elements and an antenna coupling element that controls power feeding for the two radiating elements.

For example, some communication antennas for mobile phones need to cover a wide frequency range such as about 0.6 GHz to about 2.7 GHz. Moreover, for the purpose of implementing carrier aggregation, in which the transmission rate is increased by using a plurality of frequency ranges together, there is a demand for an antenna device that can use a wide range of frequencies together.

The antenna device disclosed in Japanese Patent No. 5505561 is formed by coupling an antenna coupling element, which is configured to implement a transformer, between two radiating elements (a feeding radiating element and a parasitic radiating element) and a feeding circuit. The antenna device having this configuration is very useful in covering a wide range of frequencies together.

However, as functions of communication terminal apparatuses including antenna devices are enhanced, the antenna space is accordingly decreased, and as a result, the feeding radiating element and the parasitic radiating element have to be arranged close to each other. Thus, the electric field coupling between the feeding radiating element and the parasitic radiating element is strengthened because, for example, a part of the feeding radiating element and a part of the parasitic radiating element are positioned in parallel with each other in close proximity.

Such a condition causes a problem in which sufficient radiation efficiency cannot be obtained when the current flowing through the parasitic radiating element due to the antenna coupling element and the current flowing through the parasitic radiating element due to the electric field coupling weaken each other.

When the amount of current flowing through the parasitic radiating element is less than the amount of current that should flow through the parasitic radiating element as described above, the radiation efficiency of the parasitic radiating element is lowered.

SUMMARY OF THE INVENTION

Preferred embodiments of the present invention provide antenna devices and communication terminal apparatuses in each of which, in a condition that direct coupling due to parasitic capacitance and indirect coupling via an antenna coupling element exist between two radiating elements, a decrease in the radiation efficiency due to currents flowing into one of the radiating elements and weakening each other is significantly reduced or prevented.

An antenna device according to a preferred embodiment of the present invention includes a first radiating element, a second radiating element, a first coil coupled to at least one of the first radiating element and a feeding circuit, a second coil coupled to the second radiating element and coupled to the first coil via an electromagnetic field, and an inductor. The first radiating element and the second radiating element are coupled to each other via an electric field. The first coil and the second coil define a transformer. At a fundamental resonant frequency of a resonance circuit defined by the second radiating element and the transformer, an absolute value of a phase difference between a current flowing into the second radiating element due to the electromagnetic field and a current flowing into the second radiating element due to the electric field exceeds about 90 degrees. The inductor is coupled in series with the second coil to generate the resonant frequency of the resonance circuit to be set at a frequency of a (2n+1)th harmonic, where n is an integer equal to or greater than 1.

With the features described above, the current at the (2n+1)th harmonic, where n is an integer equal to or greater than 1, flows through the second radiating element and the resonance of this harmonic contributes to the radiation of the second radiating element. Furthermore, in the condition that the current flowing into the second radiating element due to electromagnetic field coupling between the first coil and the second coil, which is of the fundamental resonance of the resonance circuit defined by the second radiating element and the transformer, and the current flowing in the second radiating element due to electric field coupling between the first radiating element and the second radiating element weaken each other, the inductor is coupled in series with the second coil, and as a result, the current of the harmonic resonance flowing into the second radiating element due to electromagnetic coupling between the first coil and the second coil and the current flowing in the second radiating element due to electric field coupling between the first radiating element and the second radiating element do not weaken each other. Thus, a decrease in the radiation efficiency of the second radiating element due to the currents weakening each other is able to be significantly reduced or prevented.

Accordingly, the features described above implement an antenna device with high radiation efficiency in a frequency range within a communication frequency range.

Preferred embodiments of the present invention provide antenna devices and communication terminal apparatuses in each of which, in a condition that direct coupling due to parasitic capacitance and indirect coupling via an antenna coupling element exist between two radiating elements, a decrease in the radiation efficiency due to currents flowing into one of the radiating elements and weakening each other is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
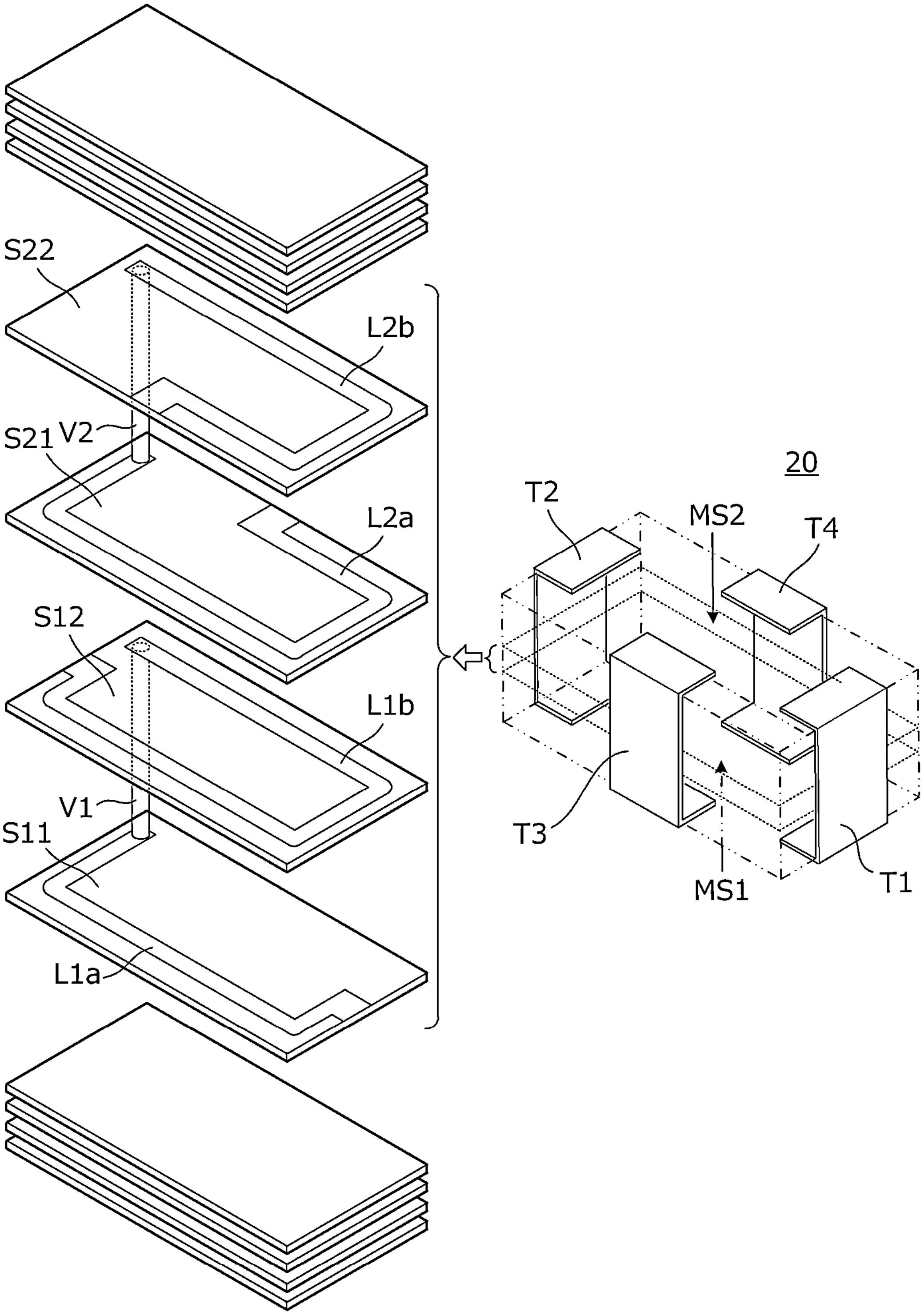
FIG. 1 provides a perspective view of an antenna coupling element 20 used in an antenna device and a communication terminal apparatus as a preferred embodiment of the present invention and an exploded perspective view of a portion of the antenna coupling element.

FIG. 1 provides a perspective view of an antenna coupling element 20 used in an antenna device and a communication terminal apparatus according to a preferred embodiment of the present invention and an exploded perspective view of a portion of the antenna coupling element 20. The antenna coupling element 20 of the present preferred embodiment is a parallelepiped or substantially parallelepiped chip component mounted at a circuit board in a communication terminal apparatus. FIG. 1 separately shows the outer shape and the internal structure of the antenna coupling element 20. A first radiating element connection terminal T1, a feeding circuit connection terminal T2, a ground connection terminal T3, and a second radiating element connection terminal T4 are formed at the outer surface of the antenna coupling element 20. The antenna coupling element 20 has a first surface MS1 and a second surface MS2 that is a surface opposite to the first surface MS1. In this preferred embodiment, the first surface MS1 or the second surface MS2 is the mounting surface.

Conductor patterns L1*a*, L1*b*, L2*a*, and L2*b* are provided inside the antenna coupling element 20. The conductor pattern Lia and the conductor pattern Lib are coupled to each other via an interlayer connection conductor V1. The conductor pattern L2*a* and the conductor pattern L2*b* are coupled to each other via an interlayer connection conductor V2. In FIG. 1, insulating base layers S11, S12, S21 and S22 on which the respective conductor patterns are provided are shown separately in the stacking direction.

When the antenna coupling element 20 is provided by using a resin multilayer substrate, the insulating base layer is preferably, for example, a liquid crystal polymer (LCP) sheet, and the conductor patterns L1*a*, L1*b*, L2*a*, and L2*b* are preferably formed by, for example, patterning copper foils. When the antenna coupling element 20 is provided by using a ceramic multilayer substrate, the insulating base layer is preferably made of, for example, low temperature co-fired ceramics (LTCC), and the conductor patterns L1*a*, L1*b*, L2*a*, and L2*b* are formed by, for example, applying a copper paste.

Since the base layer is made of a non-magnetic material (not formed of a magnetic ferrite), the antenna coupling element 20 is able to define a transformer of a predetermined inductance and a predetermined coupling coefficient preferably in a high frequency range of about 0.6 GHz to about 2.7 GHz, for example.

The conductor patterns L1*a*, L1*b*, L2*a*, and L2*b* are provided centrally in the middle layer of the multilayer body, and as a result, an interval is provided between a ground conductor at the circuit board and a first coil L1 and a second coil L2 in the state in which the antenna coupling element 20 is mounted at the circuit board. Further, if a metal component or element approaches the upper portion of the antenna coupling element 20, an interval still exists between this metal component or element and the first coil L1 and the second coil L2. As a result, the magnetic field generated by the first coil L1 and the second coil L2 described later is less likely to be affected by the outside environment and stable characteristics are able to be provided.

Figure 2:
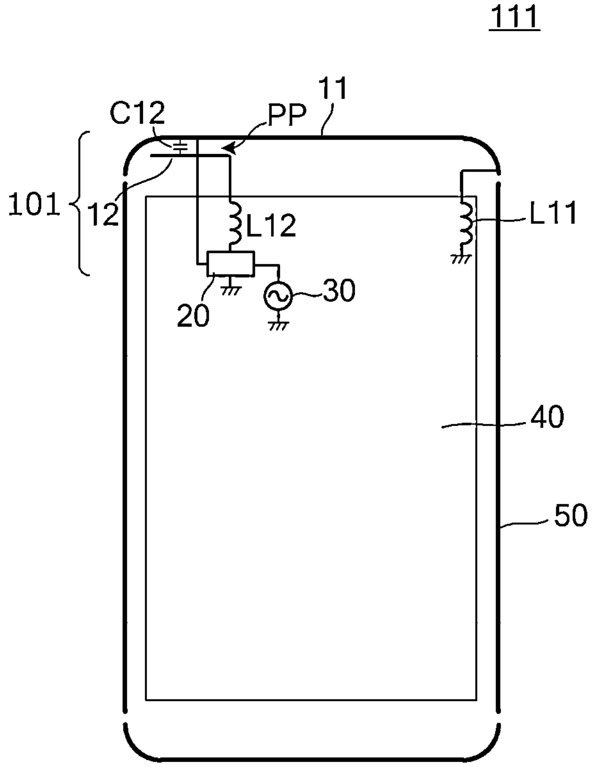
FIG. 2 is a plan view of an antenna device and the communication terminal apparatus including the antenna device.

FIG. 2 is a plan view of an antenna device 101 and a communication terminal apparatus 111 including the antenna device 101. The communication terminal apparatus 111 includes a first radiating element 11, a second radiating element 12, a circuit board 40, and a housing 50.

A feeding circuit 30 is formed at the circuit board 40. Additionally, the antenna coupling element 20, an inductor L12, and an inductor L11 are mounted at the circuit board 40.

The first radiating element 11 is formed at a portion of the housing that is electrically independent from the main portion of the housing 50 of the communication terminal apparatus 111. The second radiating element 12 is provided as a conductor pattern provided at a resin portion in the housing 50 by employing the laser-direct-structuring (LDS) process, for example. The second radiating element 12 is not limited to this example and may be provided as a conductor pattern at a flexible printed circuit (FPC) by employing a photoresist process, for example.

The first radiating element connection terminal (T1 shown in FIG. 1) of the antenna coupling element 20 is coupled to the first radiating element 11, the feeding circuit connection terminal (T2 shown in FIG. 1) is coupled to the feeding circuit 30, and the ground connection terminal (T3 shown in FIG. 1) is coupled to a ground conductor pattern. The inductor L12 is coupled between the second radiating element connection terminal (T4 shown in FIG. 1) and the second radiating element 12.

The inductor L11 is coupled between one end of the first radiating element 11 and ground.

The first radiating element 11 operates as a loop antenna in conjunction with the inductor L11 and the ground conductor pattern provided at the circuit board. The second radiating element 12 operates as a monopole antenna.

A parasitic capacitance C12 between radiating elements is provided at a portion PP between a portion of the first radiating element 11 and the second radiating element 12. The first radiating element 11 and the second radiating element 12 are coupled to each other via an electric field by the parasitic capacitance C12. The parasitic capacitance C12 is provided mainly between a portion of the first radiating element 11 and a portion of the second radiating element 12 that are positioned in parallel or substantially in parallel with each other.

As shown in FIG. 2, when the loop antenna includes the first radiating element 11, the space for the first radiating element 11 is able to be reduced. Furthermore, with the loop antenna structure, changes in antenna characteristics of the first radiating element 11 due to the proximity of the human body are able to be significantly reduced or prevented. Further, by positioning the second radiating element 12 having a monopole structure inside the structure with respect to the loop antenna, changes in antenna characteristics of the second radiating element 12 due to the proximity of the human body are able to be significantly reduced or prevented.

Figure 3:
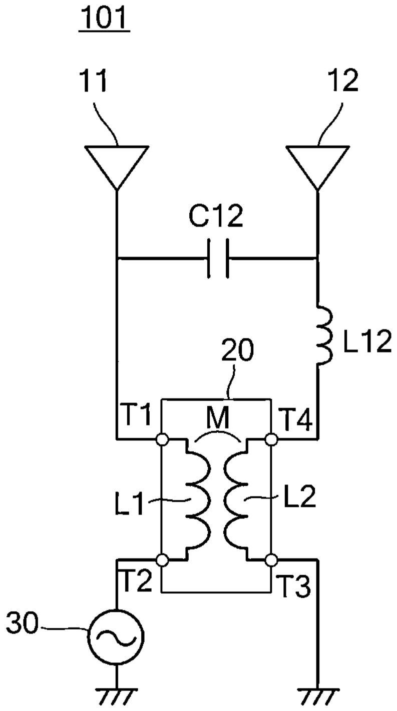
FIG. 3 is a circuit diagram of the antenna device including the antenna coupling element.

FIG. 3 is a circuit diagram of the antenna device 101 including the antenna coupling element 20. The antenna coupling element 20 includes the first coil L1 and the second coil L2 that are coupled to each other via a magnetic field. M in FIG. 3 indicates this magnetic field coupling.

The first radiating element 11 resonates in frequency ranges of a low band (for example, about 0.60 GHz to about 1.71 GHz) and a high band (for example, about 1.71 GHz to about 2.69 GHz). Specifically, the first radiating element 11, to which the first coil L1 is coupled, supports a low band that is a frequency band mainly including a "fundamental resonant frequency" and also supports a high band that is a frequency band including a "third harmonic resonant frequency" and a "fifth harmonic resonant frequency". Here, "resonance of the first radiating element" denotes resonance of the first radiating element 11 and the antenna coupling element 20.

In this specification, the resonant frequency of an m-th harmonic wave is referred to as an "m-th resonant frequency". m is an integer equal to or greater than 1. The fundamental resonant frequency is at m=1. The second radiating element 12 supports, in conjunction with the antenna coupling element 20 and the inductor L12, a high band (for example, about 1.71 GHz to about 2.69 GHz) by resonating at the third harmonic.

The following description relates to a decrease in the radiation efficiency of the second radiating element 12 due to currents flowing into the second radiating element 12 and weakening each other in a condition in which direct coupling due to the parasitic capacitance between the first radiating element 11 and the second radiating element 12 and indirect coupling via the antenna coupling element 20 exist together.

Figure 13:
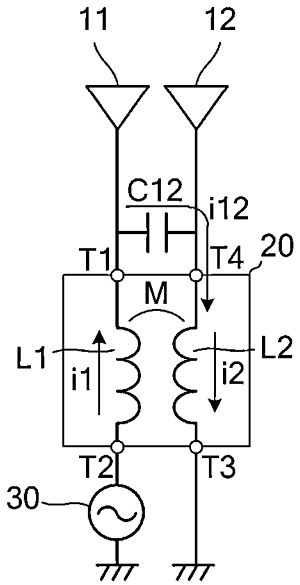
FIG. 13 is a circuit diagram of an antenna device as a comparative example.

FIG. 13 is a circuit diagram of an antenna device as a comparative example. The first radiating element 11 is fed with power from the feeding circuit 30 through the first coil L1. The second radiating element 12 is fed with power from the second coil L2 (power is supplied with a current flowing through the second coil L2). For example, when a current i1 flows in the first coil L1, magnetic field coupling between the first coil L1 and the second coil L2 induces a current i2 in the second coil L2, and as a result, the second radiating element 12 is fed (driven) with power supplied with the current i2. M in FIG. 13 indicates this magnetic field coupling. In addition, the second radiating element 12 is coupled to the first radiating element 11 via an electric field by the parasitic capacitance C12. Due to this electric field coupling, a current i12 flows in the second radiating element 12 through the second coil L2.

As shown in FIG. 13, when the absolute value of the phase difference between the current i2 flowing into the second radiating element 12 due to electromagnetic field coupling between the first coil L1 and the second coil L2 and the current i12 flowing into the second radiating element 12 due to electric field coupling exceeds about 90 degrees, the current i12 and the current i2 weaken each other.

In practice, it is difficult to directly measure the current i2 induced in the second radiating element 12 by the electromagnetic field coupling described above without interference with the antenna by using a current probe or the like. To deal with this problem, for example, in the antenna device shown in FIG. 13, the first radiating element 11 and the second radiating element 12 are physically spaced apart from each other, and the phase of the current i2 at a predetermined frequency is determined by measuring the current flowing across the second radiating element 12 and the second coil L2 at a predetermined frequency by using a network analyzer or the like. Specifically, with the structure changed as described above, 2×2 S (Scattering) parameters of two input ends, which are an input end of the first radiating element 11 (an end on the power supply side of the first radiating element 11) and an input end of the second radiating element 12 (an end on the ground side of the second radiating element 12), are measured and 4×4 S parameters of only the antenna coupling element 20 having the four terminals T1 to T4 are also measured; accordingly, the phase of the current i2 flowing into the radiating element 12 due to electromagnetic field coupling is determined by performing calculation on a circuit simulator with the use of the S parameters.

Alternatively, for example, in the antenna device shown in FIG. 13, the antenna coupling element 20 is removed. Accordingly, the phase of the current i12 flowing into the second radiating element 12 due to electric field coupling is determined by measuring the phase of the current flowing across the second radiating element 12 and ground at a predetermined frequency by using a network analyzer or the like. However, direct measurement is not easily performed. Accordingly, for example, 2×2 S parameters of two input ends, which are the input end of the first radiating element 11 and the input end of the second radiating element 12, are firstly measured; then, the 2×2 S parameters are measured again in the state in which the antenna coupling element 20 is removed; and accordingly, the phase of the current i12 flowing into the second radiating element 12 is determined by performing calculation on a circuit simulator by using the S parameters.

In the present preferred embodiment, the second radiating element 12 resonates at the third harmonic with the antenna coupling element 20 and the inductor L12 in a frequency range of the high band (for example, about 1.71 GHz to about 2.69 GHz). In other words, the inductor L12 causes the resonance of the second radiating element 12 and the antenna coupling element 20 in the high band frequency range to be the resonance at the third harmonic. This resonant frequency is, for example, about 2.1 GHz, which reduces or prevents the currents i12 and i2 from weakening each other, as will be described below with respect to current distribution.

Figure 4:
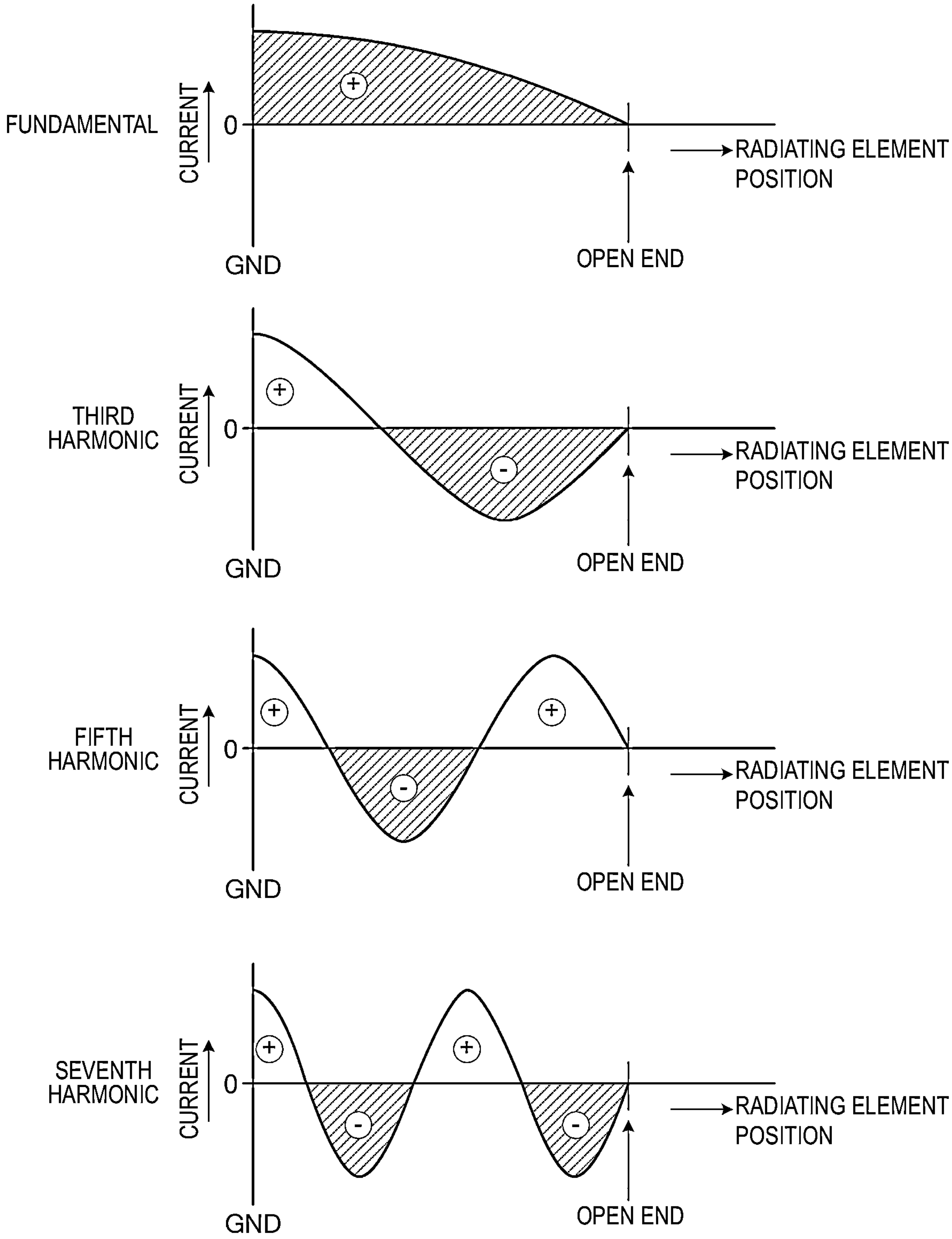
FIG. 4 shows examples of current distribution with regard to a second radiating element.

FIG. 4 shows examples of current distribution with regard to the second radiating element 12. FIG. 4 shows current distributions at a given time with respect to the fundamental resonance to the seventh harmonic resonance of the second radiating element 12 and the antenna coupling element 20.

When the fundamental resonance and the third harmonic resonance are compared to each other, the positive current is distributed in the case of the fundamental resonance, while the negative current is dominantly distributed in the case of the third harmonic; in other words, there are more opposite polarity current components in comparison to the fundamental resonance. Thus, under the condition that the fundamental current flowing into the second radiating element 12 due to electromagnetic field coupling between the first coil L1 and the second coil L2 and the fundamental current flowing into the second radiating element 12 due to electric field coupling between the first radiating element 11 and the second radiating element 12 weaken each other, that is, under the condition that, for example, in the circuit shown in FIG. 13, when the second radiating element 12 and the antenna coupling element 20 resonate at the fundamental, the absolute value of the phase difference between the current i2 flowing into the second radiating element 12 due to electromagnetic field coupling between the first coil L1 and the second coil L2 and the current i12 flowing into the second radiating element 12 due to electric field coupling exceeds about 90 degrees, the third harmonic current flowing into the second radiating element 12 due to electromagnetic field coupling between the first coil L1 and the second coil L2 and the current flowing into the second radiating element 12 due to electric field coupling between the first radiating element 11 and the second radiating element 12 are inhibited from weakening each other.

While the example of the third harmonic resonance of the second radiating element 12 has been described with reference to FIG. 4, the fifth and seventh harmonics, which indicate opposite polarity current distributions, that is, negative current distributions, are also effective when the positive current is distributed in the case of the fundamental resonance. However, since the negative current is dominantly distributed in the cases of the third and seventh harmonics, the third and seventh harmonics are more preferable, for example, to reduce or prevent the current flowing into the second radiating element 12 due to electric field coupling between the first radiating element 11 and the second radiating element 12 from being weakened. Furthermore, between the third and seventh harmonics, the third harmonic is more preferable, for example, because the third harmonic indicates larger negative current distribution.

Figure 5:
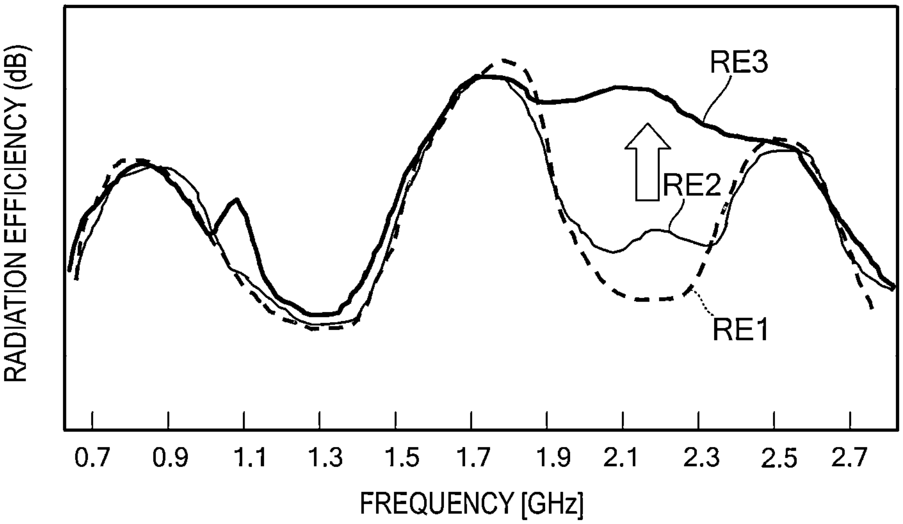
FIG. 5 shows the frequency characteristic with respect to the radiation efficiency of the antenna device.

FIG. 5 shows the frequency characteristic with respect to the radiation efficiency of the antenna device 101. In FIG. 5, RE1 is the radiation efficiency of only the second radiating element 12, RE2 is the radiation efficiency of the antenna device of the comparative example, and RE3 is the radiation efficiency of the antenna device 101 of the present preferred embodiment. The antenna device of the comparative example is an antenna device not including the inductor L12, and the third harmonic resonant frequency of a resonance circuit defined by the second radiating element 12, the antenna coupling element 20, and the inductor L12 is outside the communication frequency range of the antenna device of the comparative example. In the antenna device of the comparative example, as shown in FIG. 13, the absolute value of the phase difference between the current i12 flowing into the second radiating element 12 due to electromagnetic field coupling between the first coil L1 and the second coil L2 and the current i2 flowing into the second radiating element 12 due to electric field coupling exceeds about 90 degrees and the current i12 and the current i2 weaken each other. The resonance of the second radiating element 12 and the antenna coupling element 20 is able to be changed by increasing the self-inductance value of the second coil L2. However, the self-resonant frequency of the antenna coupling element 20 decreases and falls within the communication frequency range of the antenna device 101, and as a result, sufficient radiation efficiency may not be provided.

In FIG. 5, the frequency band of about 0.6 GHz to about 1.0 GHz is a frequency range with high radiation efficiency due to the fundamental resonance of the first radiating element 11 and the antenna coupling element 20 and the third harmonic resonance of the second radiating element 12, the antenna coupling element 20, and the inductor L12 (the fundamental resonance of the second radiating element 12 and the antenna coupling element 20 in the case of only the second radiating element 12 without the inductor L12). The frequency band of about 1.7 GHz to about 1.9 GHz is a frequency range with high radiation efficiency due to the third harmonic resonance of the first radiating element 11. The frequency band of about 2.4 GHz to about 2.6 GHz band is a frequency range with high radiation efficiency due to the fifth harmonic resonance of the first radiating element 11.

As seen from FIG. 5, in the antenna device of the comparative example, due to the effect caused by the currents weakening each other in the frequency range of about 1.8 GHz to about 2.5 GHz, the effect of coupling with the use of the antenna coupling element 20 is relatively low, and as a result, the radiation efficiency is not high. This frequency range is the third harmonic resonant frequency of the resonance circuit defined by the second radiating element 12, the antenna coupling element 20, and the inductor L12 in the antenna device of the present preferred embodiment; in the present preferred embodiment, this frequency range exists between the third harmonic resonant frequency and the fifth harmonic resonant frequency of the first radiating element 11.

As seen from FIG. 5, in the frequency range of about 0.6 GHz to about 1.8 GHz, the radiation efficiency RE3 of the antenna device 101 of the present preferred embodiment is equal or substantially equal to the radiation efficiency RE2 of the antenna device of the comparative example, but at about 1.8 GHz or higher, the antenna device 101 of the preferred embodiment provides higher radiation efficiency. In this frequency range, in the antenna device 101 of the present preferred embodiment, the effect of the currents i12 and i2 weakening each other is decreased, and as a result, the currents i12 and i2 do not weaken each other but rather strengthen each other.

FIG. 5 shows the example in which the third harmonic resonant frequency of the resonance circuit defined by the second radiating element 12, the antenna coupling element 20, and the inductor L12 exists between the third harmonic resonant frequency and the fifth harmonic resonant frequency of the first radiating element 11, but the third harmonic resonant frequency of the resonance circuit may exist between the fundamental resonant frequency and the third harmonic resonant frequency of the first radiating element 11.

The examples shown in FIG. 5 and other drawings take the third harmonic resonance as an example of harmonic resonance of the resonance circuit defined by the antenna coupling element 20, the inductor L12, and the second radiating element 12, but a (2n+1)th harmonic resonant frequency, where n is an integer equal to or greater than 1, for example, the seventh harmonic resonance, may be used. However, as already described with reference to FIG. 4, the effect of currents weakening each other is lower in the case of the third and seventh harmonics than in the case of the fifth harmonic. The effect of currents weakening each other due to electric field coupling between radiating elements is relatively lower in the case of a (4n−1)th harmonic resonant frequency.

As described with reference to FIG. 5, the feeding circuit 30 shown in FIGS. 2 and 3 inputs and outputs communication signals including the resonant frequency of the second radiating element 12, the harmonic resonant frequency described above, and the third harmonic resonant frequency and the fifth harmonic resonant frequency of the first radiating element 11. As a result, a communication terminal apparatus that handles broadband communication signals is able to be implemented.

Figure 6:
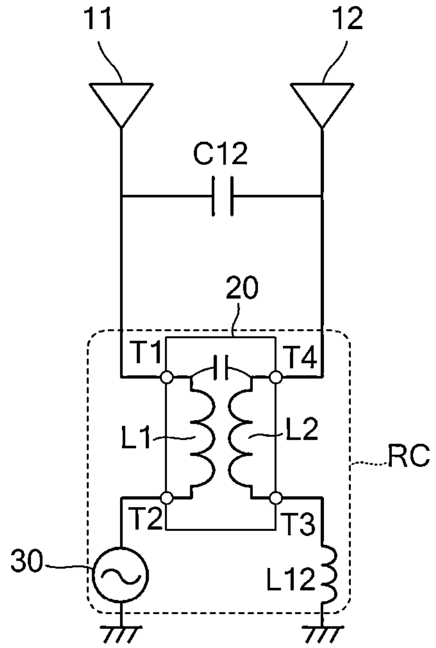
FIG. 6 is a circuit diagram of an antenna device in which the position of an inductor is different from that of the antenna device shown in FIG. 3.

FIG. 6 is a circuit diagram of an antenna device according to a preferred embodiment of the present invention. This antenna device differs from the antenna device shown in FIG. 3 in the position of the inductor L12. In the example shown in FIG. 6, the inductor L12 is coupled between the ground connection terminal T3 of the antenna coupling element 20 and ground. Other features, components, and elements are the same as or similar to those of the antenna device shown in FIG. 3.

Since the resonant frequency of the circuitry including the second radiating element 12 is determined by the circuitry from the open end of the second radiating element 12 to ground, when the inductor L12 is coupled between the ground connection terminal T3 of the antenna coupling element 20 and ground as shown in FIG. 6, the resonant frequency of the second radiating element 12 is also able to be determined by the inductance of the inductor L12.

The parasitic capacitance between the first coil L1 and the second coil L2 of the antenna coupling element 20, the first coil L1, the second coil L2, and the inductor L12 define a self-resonant circuit RC. Since this self-resonant circuit RC includes the inductor L12, its resonant frequency is lower than the resonant frequency of the self-resonant circuit including the circuitry shown in FIG. 3. Accordingly, from the viewpoint of providing an antenna that device supports a wide frequency range, the inductor L12 is preferably provided at the position shown in FIG. 3, for example.

Next, examples of an antenna device including features of individual portions different from those of the antenna devices described above will be provided.

Figure 7:
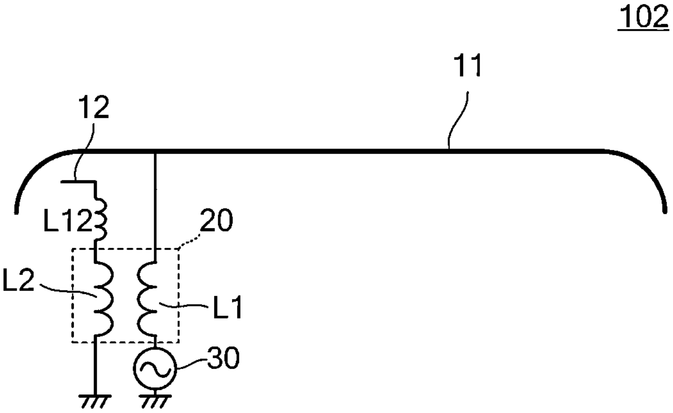
FIG. 7 shows an antenna device according to a preferred embodiment of the present invention.

FIG. 7 shows an antenna device according to a preferred embodiment of the present invention. The antenna device 102 includes the first radiating element 11, the second radiating element 12, the antenna coupling element 20, and the inductor L12. The first radiating element 11 and the second radiating element 12 are both monopole radiating elements.

Accordingly, the features described herein are able to be similarly applied to the antenna device in which the first radiating element 11 is also a monopole antenna.

Figure 8:
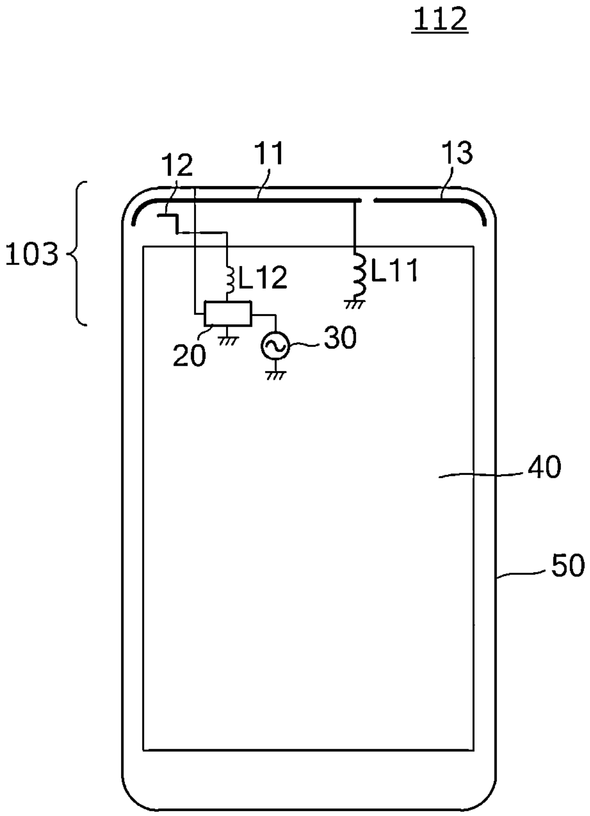
FIG. 8 is a plan view of an antenna device and a communication terminal apparatus including the antenna device.

FIG. 8 is a plan view of an antenna device 103 and a communication terminal apparatus 112 including the antenna device 103 according to a preferred embodiment of the present invention. The communication terminal apparatus 112 includes the first radiating element 11, the second radiating element 12, a third radiating element 13, the circuit board 40, and the housing 50.

The feeding circuit 30 is provided at the circuit board 40. Additionally, the antenna coupling element 20, the inductors L12 and L11 are mounted at the circuit board 40.

The first radiating element 11, the second radiating element 12, and the third radiating element 13 are defined by conductor patterns provided at a resin portion in the housing 50 by using the laser-direct-structuring (LDS) process. The first radiating element 11, the second radiating element 12, and the third radiating element 13 are not limited to this example and may be defined by conductor patterns at a flexible printed circuit (FPC) by employing a photoresist process.

The inductor L11 is coupled between one end of the first radiating element 11 and ground.

The first radiating element 11 operates as a loop antenna in conjunction with the inductor L11 and the ground conductor pattern provided at the circuit board. The second radiating element 12 operates as a monopole antenna. The third radiating element 13 is, for example, a GPS antenna and is coupled to a feeding circuit different from the feeding circuit 30.

Other features are the same as or similar to those of the antenna device shown in FIG. 2 and other drawings. As described above, the first radiating element 11 may be defined by a conductor pattern.

Figure 9:
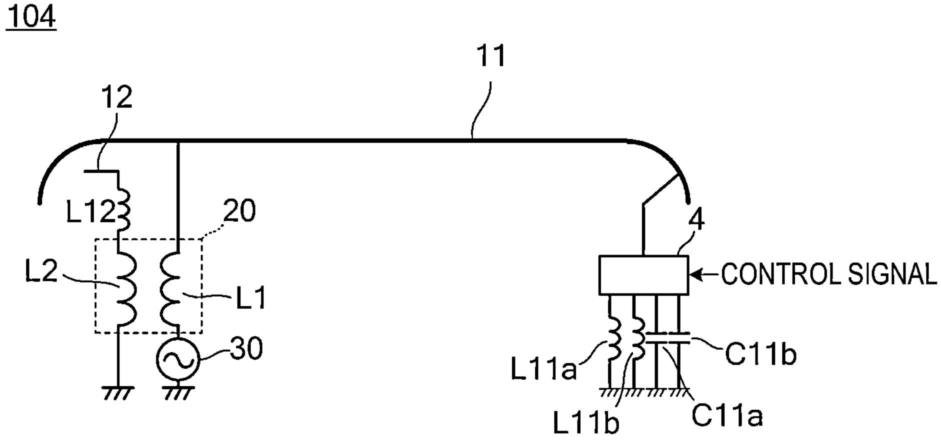
FIG. 9 shows an antenna device.

FIG. 9 shows an antenna device 104 according to a preferred embodiment of the present invention. The antenna device 104 includes the first radiating element 11, the second radiating element 12, the antenna coupling element 20, inductors L11*a* and L11*b*, capacitors C11*a* and C11*b*, and a switch 4. The switch 4 selectively connects one of the inductors L11*a* and L11*b* and the capacitors C11*a* and C11*b* to an end of the first radiating element 11 in accordance with control signals provided from the outside of the antenna device. As a result, the effective length of the antenna is able to be changed by the switch 4.

The inductors L11*a* and L11*b* have different inductances and the capacitors C11*a* and C11*b* have different capacitances. The resonant frequency of the first radiating element 11 is able to be changed in accordance with a particular one selected from the reactance elements L11*a*, L11*b*, C11*a* and C11*b*. Other features are the same as or similar to those shown in FIG. 2.

Figure 10:
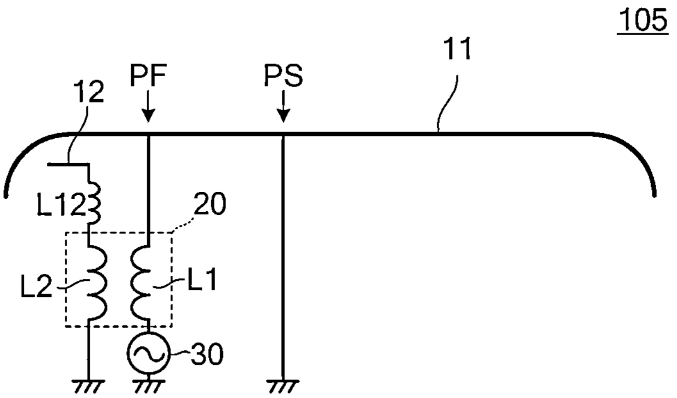
FIG. 10 shows an antenna device.

FIG. 10 shows an antenna device 105 according to a preferred embodiment of the present invention. The antenna device 105 includes the first radiating element 11, the second radiating element 12, and the antenna coupling element 20. The feeding circuit 30 is coupled to a feed point PF of the first radiating element 11 via the first coil L1 of the antenna coupling element 20. Ends of the first radiating element 11 are open and a predetermined grounding point PS in the middle of the first radiating element 11 is grounded. Accordingly, the first radiating element 11 operates as an inverted F antenna. Furthermore, when the first radiating element 11 is a conductor extending to have a planar or substantially planar shape, the first radiating element 11 defines and functions as a planar inverted-F antenna (PIFA). By providing the first radiating element 11 as an inverted F antenna or PIFA as described above, the impedance of the first radiating element 11 is able to be set at approximately the same impedance as the impedance of the feeding circuit, and as a result, impedance matching is able to be easily provided.

Accordingly, the features described herein are also able to be applied to an antenna device in which the first radiating element 11 is an inverted F antenna or PIFA.

Figure 11:
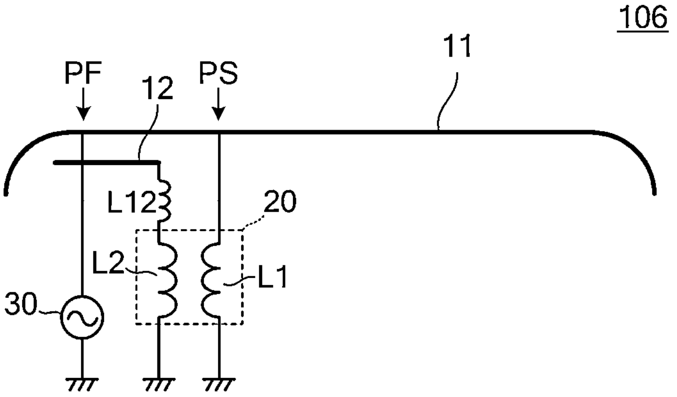
FIG. 11 shows an antenna device.

FIG. 11 shows an antenna device 106 according to a preferred embodiment of the present invention. The antenna device 106 includes the first radiating element 11, the second radiating element 12, and the antenna coupling element 20. The feeding circuit 30 is coupled to the feed point PF of the first radiating element 11. The first coil L1 of the antenna coupling element 20 is coupled between the predetermined ground point PS of the first radiating element 11 and ground. The second radiating element 12 is coupled to the second coil L2 of the antenna coupling element 20. Accordingly, the first radiating element 11 operates as an inverted F antenna. Furthermore, when the first radiating element 11 is a conductor extending to have a planar or substantially planar shape, the first radiating element 11 defines and functions as a planar inverted-F antenna (PIFA).

The preferred embodiments of the present invention are also able to be applied to an antenna device including an inverted F antenna or PIFA including the features described herein.

Figure 12:
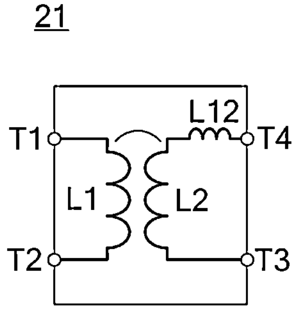
FIG. 12 is a circuit diagram of an antenna coupling element.

While the examples described above include the first coil L1 and the second coil L2 defining the antenna coupling element as one component, the antenna coupling element 20 may be constructed as a single component including the inductor L12, as shown in a circuit diagram of an antenna coupling element 21 in FIG. 12. The antenna coupling element 21 includes not only the first coil L1 and the second coil L2, which are coupled to each other via an electromagnetic field, but also the inductor L12. The inductor L12 is provided between the second coil L2 and the second radiating element connection terminal T4. The inductor L12 is formed as a coil conductor pattern positioned not to be coupled to the first coil L1 and the second coil L2. Alternatively, a wiring portion of a conductor pattern may be provided as the inductor L12. As described above, the inductor L12 is preferably positioned to reduce the effect on electromagnetic field coupling, for example. Accordingly, the decrease in the self-resonant frequency of the antenna coupling element 20 is able to be significantly reduced or prevented.

Finally, the foregoing description of the preferred embodiments is illustrative in all respects and not restrictive. Those skilled in the art may implement modifications and changes as appropriate. The scope of the present invention is defined by the claims rather than the preferred embodiments described above. Furthermore, all changes to the preferred embodiments which come within the range of equivalency of the claims are embraced in the scope of the present invention.

For example, while the inductor L12 is shown as a circuit element in the circuit diagrams, the inductor L12 may be provided as a conductor pattern instead of a mounted component, for example, a chip inductor. Moreover, it suffices that the resonant frequency of the circuit defined by the second radiating element 12 and the antenna coupling element 20 resonates at the third harmonic within a predetermined frequency range. Accordingly, the effective length of the second radiating element 12 may be elongated by, for example, reducing the line width of the second radiating element 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
- a first radiating element;
- a second radiating element;
- a first coil coupled to at least one of the first radiating element and a feeding circuit;
- a second coil coupled to the second radiating element and coupled to the first coil via an electromagnetic field; and
- an inductor; wherein
- the first radiating element is a loop antenna;
- the first radiating element and the second radiating element are coupled to each other via an electric field;
- the first coil and the second coil define a transformer;
- at a fundamental resonant frequency of a resonance circuit defined by the second radiating element and the transformer, an absolute value of a phase difference between a current flowing into the second radiating element due to the electromagnetic field and a current flowing into the second radiating element due to the electric field exceeds about 90 degrees; and
- the inductor is coupled in series with the second coil to generate a harmonic resonance in which the resonance circuit resonates at a (2n+1)th harmonic, where n is an integer equal to or greater than 1.

2. The antenna device according to claim 1, wherein the harmonic resonance is generated at a (4n−1)th harmonic, where n is an integer equal to or greater than 1.

3. The antenna device according to claim 1, wherein a frequency of the harmonic resonance exists between a fundamental resonant frequency of the first radiating element and a third harmonic resonant frequency of the first radiating element or between the third harmonic resonant frequency of the first radiating element and a fifth harmonic resonant frequency of the first radiating element.

4. The antenna device according to claim 1, wherein the harmonic resonance is generated at a third harmonic.

5. The antenna device according to claim 1, wherein the inductor, the first coil, and the second coil are provided as a single component.

6. A communication terminal apparatus comprising:
- the antenna device according to claim 1; and
- the feeding circuit; wherein
- the feeding circuit inputs and outputs communication signals of a fundamental resonant frequency of the second radiating element, a frequency of the harmonic resonance, a third harmonic resonant frequency of the first radiating element, and a fifth harmonic resonant frequency of the first radiating element.

7. The antenna device according to claim 1, wherein
- the first coil is defined by at least one first conductor pattern provided on a first layer of a substrate; and
- the second coil is defined by at least one second conductor pattern provided on a second layer of the substrate.

8. The antenna device according to claim 7, wherein
- the substrate is a multilayer body;
- the at least one first conductor pattern is coupled by a first interlayer connection conductor to another first conductor pattern provided on a different layer of the substrate from the at least one first conductor pattern; and
- the at least one second conductor pattern is coupled by a second interlayer connection conductor to another second conductor pattern provided on a different layer of the substrate from the at least one second conductor pattern.

9. The antenna device according to claim 7, wherein a base material of the substrate is a non-magnetic material.

10. The antenna device according to claim 1, further comprising a second inductor that is coupled between one end of the first radiating element and a ground conductor pattern.

11. The antenna device according to claim 10, wherein the first radiating element, the second inductor, and the ground conductor pattern define the loop antenna.

12. The antenna device according to claim 1, wherein the second radiating element defines a monopole antenna.

13. The antenna device according to claim 1, wherein the first radiating element resonates in a frequency range of about 0.60 GHz to about 1.71 GHz and a frequency range of about 1.71 GHz to about 2.69 GHz; and the second radiating element resonates in a frequency range of about 1.71 GHz to about 2.69 GHz.

14. The antenna device according to claim 1, further comprising:

at least one capacitor;

at least one second inductor; and a switch; wherein the switch selectively couples the at least one capacitor to the at least one second inductor to the first radiating element.

* * * * *